US010589666B2

(12) United States Patent
Vervoort et al.

(10) Patent No.: US 10,589,666 B2
(45) Date of Patent: Mar. 17, 2020

(54) OPEN ROOF CONSTRUCTION FOR A VEHICLE

(71) Applicant: Inalfa Roof Systems Group B.V., Oostrum (NL)

(72) Inventors: Stephan Christiaan Vervoort, Boxmeer (NL); Thomas Anton Martijnszoon Albers, Venray (NL)

(73) Assignee: Inalfa Roof Systems Group B.V., Oostrum (NL)

( * ) Notice: Subject to any disclaimer, the term of this patent is extended or adjusted under 35 U.S.C. 154(b) by 0 days.

(21) Appl. No.: 16/213,372

(22) Filed: Dec. 7, 2018

(65) Prior Publication Data

US 2019/0176691 A1    Jun. 13, 2019

(30) Foreign Application Priority Data

Dec. 11, 2017    (DE) .................... 20 2017 107 507 U (51) Int. Cl.
*B60Q 3/208* (2017.01)
*B60Q 3/64* (2017.01)
(Continued)

(52) U.S. Cl.
CPC ............... *B60Q 3/208* (2017.02); *B60J 7/04* (2013.01); *B60Q 3/62* (2017.02); *B60Q 3/64* (2017.02);
(Continued)

(58) Field of Classification Search
CPC . B60Q 3/208; B60Q 3/62; B60Q 3/64; B60Q 2500/00; B60J 7/04; B60J 7/043; B60J 7/022
See application file for complete search history.

(56) References Cited

U.S. PATENT DOCUMENTS 5,647,658 A        7/1997 Ziadi
2003/0026105 A1*   2/2003 Becher ...................... B60J 7/00
                                                     362/490
(Continued)

FOREIGN PATENT DOCUMENTS

DE    102009039556 A1    3/2010
DE    102011016392 A1    10/2012
(Continued)

OTHER PUBLICATIONS

European Search Report for European patent application No. 18200604.9, dated Apr. 29, 2019.

*Primary Examiner* — Anh T Mai
*Assistant Examiner* — Glenn D Zimmerman
(74) *Attorney, Agent, or Firm* — Steven M. Koehler; Westman, Champlin & Koehler, P.A.

(57) ABSTRACT

An open roof construction for a vehicle includes at least one cover capable of closing an opening in a fixed roof of the vehicle. The at least one cover comprises a light emitting layer capable of guiding light from a longitudinal edge of the light emitting layer, substantially parallel to a longitudinal direction of the vehicle, towards a main surface and capable of emitting light from a main surface of the light emitting layer towards an interior space of the vehicle. The cover further comprises a light device for emitting light into the light emitting layer, the light device including at least one light source and a light guide for guiding the light from the light source to the edge of the light emitting layer, wherein in the light guide is formed by a bundle of light fibers existing of several light fibers.

20 Claims, 7 Drawing Sheets

(51) Int. Cl.
*B60Q 3/62* (2017.01)
*B60J 7/04* (2006.01)
B60J 7/02 (2006.01)
B60J 7/043 (2006.01)

(52) U.S. Cl.
CPC .......... *B60J 7/022* (2013.01); *B60J 7/043* (2013.01); *B60Q 2500/00* (2013.01)

(56) References Cited

U.S. PATENT DOCUMENTS

| | | | | |
|---|---|---|---|---|
| 2007/0160334 | A1* | 7/2007 | Cobb | B60Q 1/50 385/116 |
| 2014/0125920 | A1* | 5/2014 | Hu | G02B 6/0016 349/65 |
| 2015/0175064 | A1 | 6/2015 | Albert | |
| 2015/0298601 | A1 | 10/2015 | Bott et al. | |
| 2019/0001875 | A1* | 1/2019 | Xu | B60Q 3/51 |

FOREIGN PATENT DOCUMENTS

| | | |
|---|---|---|
| DE | 102012109909 A1 | 4/2014 |
| DE | 202015106738 U1 | 1/2016 |
| DE | 202014009548 U1 | 3/2016 |
| FR | 2979412 A1 | 3/2013 |
| FR | 3018742 A1 | 9/2015 |
| JP | 2008074262 A * | 4/2008 |
| KR | 20090115543 A | 11/2009 |

\* cited by examiner

OPEN ROOF CONSTRUCTION FOR A VEHICLE

BACKGROUND

The discussion below is merely provided for general background information and is not intended to be used as an aid in determining the scope of the claimed subject matter.

Aspects of the invention relate to an open roof construction for a vehicle, comprising at least one cover capable of closing an opening in a fixed roof of the vehicle, the at least one cover comprising a light emitting layer capable of guiding light from a longitudinal edge of the light emitting layer, substantially parallel to a longitudinal direction of the vehicle, towards a main surface and capable of emitting light from a main surface of the light emitting layer towards an interior space of the vehicle, the cover further comprising a light device for emitting light into the light emitting layer, the light device comprising at least one light source and a light guide for guiding the light from the light source to the edge of the light emitting layer.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

An open roof construction includes a light guide formed by a bundle of light fibers existing of several light fibers. As such each light fiber of the bundle of light fibers guides an equal amount of light from a light source to the area to be lighted. The light is guided inside the light fiber, and just a very small fraction of light may be lost on the way. The high efficiency of transporting the light from one end to another is basically due to the so called cladding around the core of the fiber. The amount of light emitted at the end of each of the light fibers is equal to the human eye, when comparing the light emission from each fiber. A solution for supplying an equal light pattern is provided. Such an equal light pattern may be obtained by using an array of LED's positioned adjacent to each other however such a multitude of LED's is rather cost full. And so a solution for an equal light pattern against low costs is provided.

In one embodiment the light emitting layer may be layer of glass or a plastic layer, and the light emitting layer may be either of an upper layer, an intermediate layer or a lower layer of the cover. The invention can be applied to a cover having at least one layer. For instance it can be applied to a cover with a single glass layer or of a typical double glass layer with an adhesive layer in between which is known as a laminated glass panel or cover. It is also conceivable that the light emitting layer is a thin foil layer in between two glass sheets. Also it is conceivable that the at least one layer is a plastic layer for instance made of Polycarbonate or PMMA (Polymethyl Methacrylate).

In another embodiment each of the light fibers of the bundle of light fibers at a first end are accumulated closely together and are fixed in a first connector and wherein the first connector is positioned opposite to the light emitting surface of the light source such that the light from the light source is able to enter the light fibers. The light source, which may be a LED, emits light into the first connector, in which all of the light fibers are closely packed together in such a way that the light emitted by the light source enters the light fibers equally. As such it is possible to receive light by all of the closely packed light fibers. This means that the surface of the connector may not be too large such that the outer light fibers do not receive enough of the emitted light and that a maximum of light fibers in the range of 400 light fibers can be connected in the first connector depending on the thickness of the light fibers.

In yet another embodiment wherein each of the light fibers of the bundle of light fibers, at a second end are fixed at distances X adjacent to each other in a second connector for holding the second end of the light fibers in a perpendicular direction with regard to the longitudinal edge of the light emitting layer to enable the light from the light fibers to enter the edge of the light emitting layer. The second connector holds each of the light fibers adjacent to each other at a certain distance X. The light fibers are directed perpendicularly to the longitudinal edge of the light emitting layer by means of the second connector. Light emitting from the fibers may enter the light emitting layer. It is important for the light efficiency that light enters the light emitting layer perpendicularly to its main surface. The distance X between the light fibers lies within a range of 0.125 mm. and 50 mm. and this is proved to be an optimum distance with regard to the light pattern. In case X is chosen larger than 50 mm, the light pattern will turn to be disrupted or intermittent. In case X is chosen in a smaller range towards 0.125 mm, the consequence may be that more light sources are needed to emit light into a same length of the longitudinal edge of the light emitting layer.

In another embodiment the light fibers are either of glass material or of PMMA, and wherein the diameter of the fibers lie in the range of larger than 0.125 mm for glass fibers or larger than 0.25 for PMMA. Depending on the packaging space and financial reasons (PMMA fibers are cheaper than glass fibers) a choice can be made for either of glass or PMMA light fibers.

In yet another embodiment a circumferential edge of the cover is made of encapsulation material. The cover may incorporate such material when it comprises not only one light emitting layer but also when it comprises more than one layer. As such it is conceivable that also the edges of all the layers are covered by the encapsulation material and it may also be conceivable that the light device as such is incorporated i.e. covered by the encapsulation material. On the other hand it is conceivable that not all of the layers have an edge which is covered by encapsulation material.

In another embodiment the light fibers are protected in between the first and the second end in a protective unit for avoiding the fibers to be damaged, the protective unit either being a plastic protection sleeve, a protection foil, a cover reinforcement or a protector part attached to the second connector. But it is also conceivable that the bundle of light fibers in between the first and the second end is held by clip fixings attaching the bundle of fibers at intermittent distances to the cover. The multiple of light fibers in the bundle must be somehow protected or be guided in the area between the first and the second end of the light fibers, especially when the cover is equipped with edge of encapsulation material which will surround the light device, the fibers need to be protected by a protective unit from the encapsulation material during the manufacturing process. Filing the mold with encapsulation material involves the process of hot fluid material flowing from an inlet gate to fill the cavity under high pressure. This process may damage or move the fibers in an undesirable position. It is however also conceivable that the light fibers in the area between the first and second end are positioned by clips that locally attach the bundle of light fibers to the cover in cases where the encapsulation material does not surround the light device.

In another embodiment the protective unit is a protector part, which is a protector cover connected to the second connector by means of a film hinge. As such the connector and the protector cover can be advantageously made of one injection molding part. It is even conceivable that in the same injection molding process of molding connector and protector cover also the light fibers are molded directly into the connector.

In another embodiment the connector is connected by means of double sided tape or a clip fixing to either of the light emitting layer, the cover reinforcement, a support bracket attached to the cover or to another layer of the cover. It is conceivable that the connector is connected by double sided tape to the light emitting layer. This is most advantageous since the connector is directly coupled to the light emitting layer which gives a good accuracy with respect to the position of the second end of the light fibers in relation to the longitudinal edge of the light emitting layer. It is also conceivable that the connector is connected by means of a clip fixing to the cover reinforcement or the support bracket. Such a clip fixing enables an easier mounting of the connector to the cover.

In another embodiment the light fibers extend with a radius R larger than 30 mm between the first and second end. Such limitation is required to avoid that light efficiency would be reduced due to the tendency of light to emit out of the fiber there where the radius of the fiber is too small.

In all of the previous embodiments the light emitting layer further comprises means for coupling out the light such that the light emits from a main surface towards an interior space of the vehicle. Such means may be a printed pattern fabricated in or attached to the light emitting layer, the pattern causing light emitting in the direction towards the interior of the vehicle. Or it is conceivable that these means are particles inside the light emitting layer which are illuminated and emit light towards the interior.

In another embodiment the open roof construction comprises two covers positioned adjacent to each other seen in a longitudinal direction of the vehicle and wherein each of the covers comprises a light emitting layer capable of guiding light from an longitudinal edge of the panel and capable of emitting light from a main surface into an interior space of the vehicle. In this embodiment both panels are equipped with light device which may emit light into the interior of the vehicle.

BRIEF DESCRIPTION OF THE DRAWING

Hereinafter aspects of the invention will be elucidated while referring to the drawing.

FIGS. 3 to 9a illustrate a sectional view taken along lines III-III in FIG. 1, each showing a different embodiment.

DETAILED DESCRIPTION

Figure 1:
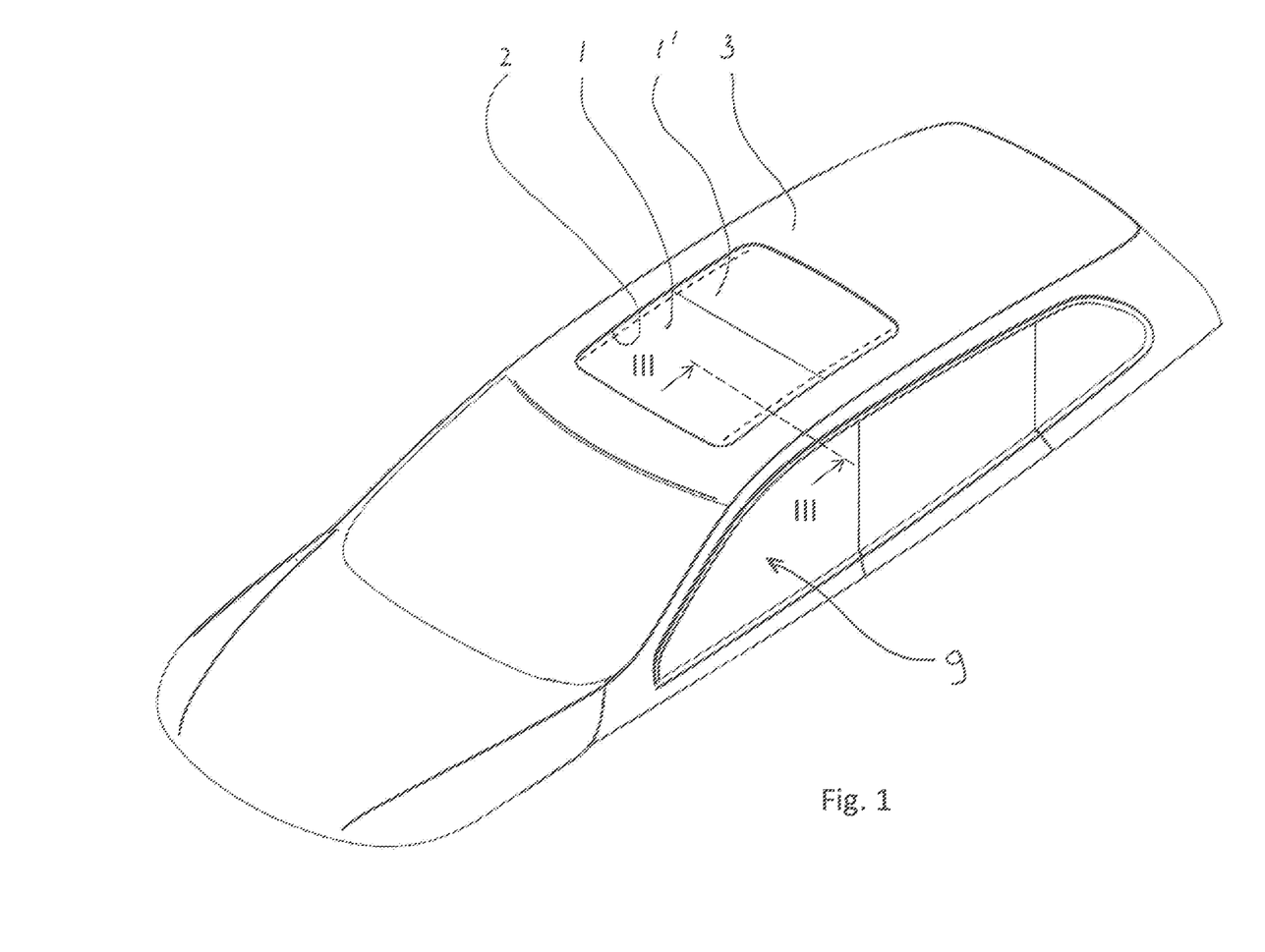
FIG. 1 illustrates a part of a vehicle with adjacent positioned covers in a closed position.

In FIG. 1 a general lay-out of a vehicle comprising an open roof construction is illustrated. The vehicle comprises a roof opening 2 in a fixed roof 3. In this case the open roof construction has two covers 1, 1' placed adjacent to each other in a longitudinal direction of the vehicle. The frontal of the two covers 1, 1' is an open able cover capable of closing and at least partly opening the roof opening 2 of the fixed roof 3. The second cover 1' placed rearward of the front cover 1 may be a stationary cover closing the remaining part of the roof opening 2, however it is also conceivable that the second cover 1' is a movable cover. Alternatively it is also conceivable to have just one cover capable of closing and at least partly opening the roof opening 2.

Figure 2:
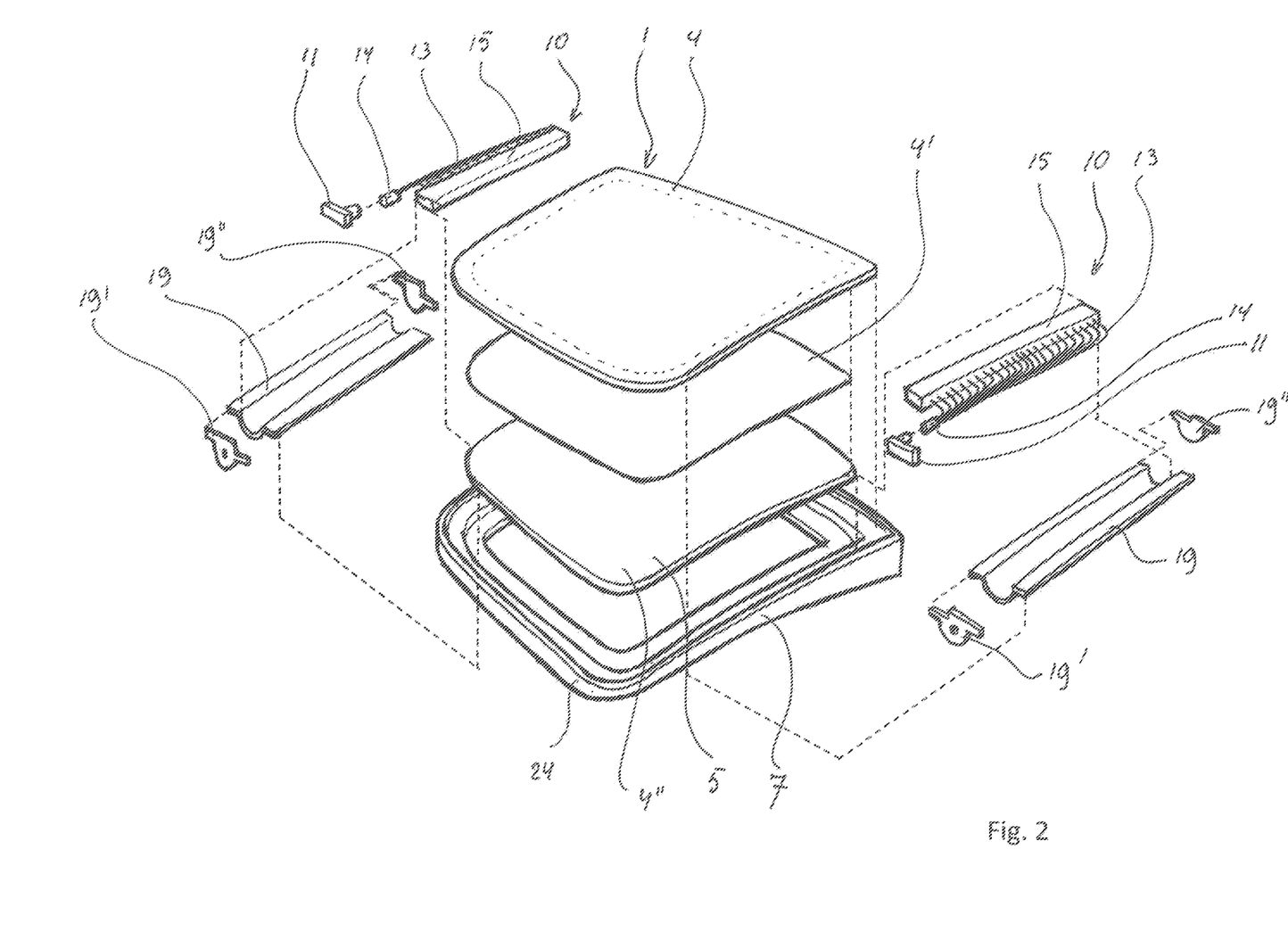
FIG. 2 schematically illustrates an exploded view the cover, the light device and the protective unit.
Figure 5:
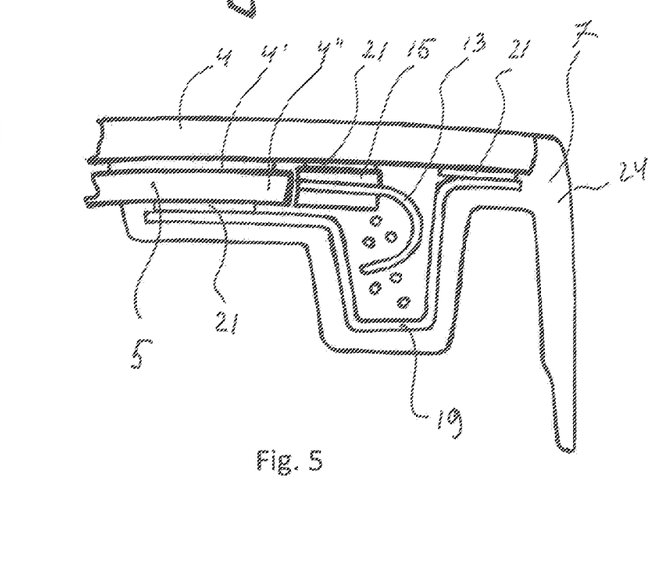

In FIG. 2 an embodiment is schematically shown in an exploded view. FIG. 2 shows the cover 1 existing of three layers; the upper layer 4 is the layer lying flush with the outside of the fixed roof 3 of the vehicle and is usually made of glass. The lower layer 4" is a layer which may be made of glass, but it is also conceivable that this layer is made of plastic such as PMMA or PC (Polycarbonate). The layer in between the upper layer 4 and the lower layer 4" is an intermediate layer 4' capable of adhering the lower layer 4" to the upper layer 4, usually this layer is a PVB (Polyvinyl butyral) layer or a PET (Polyethylene terephthalate) layer. The upper layer 4 seen in plan-view is larger compared to the lower layer 4" and as such the upper layer 4 extends a certain distance over the edge 6 of the lower layer 4", whereas the intermediate layer 4' has substantially the same size as the lower layer 4". Furthermore in this embodiment the circumferential edge 24 of the cover 1, 1' is made of an encapsulation material 7, such as PU (Polyurethane) or PVC (Polyvinyl chloride). It is conceivable that the edge of only the upper layer 4 is equipped with encapsulation material 7 however in the embodiment in FIG. 2 the encapsulation material 7 surrounds the edges of both the upper and the lower layer 4, 4". FIG. 2 further shows a light device 10 comprising a light source 11, a light guide 12 in the form of a bundle of light fibers 13. The light fibers 13 are equipped with a first connector 14 at a first end of the bundle of light fibers 13 and a second connector 15 at a second end of the bundle of light fibers 13. The first connector 14, when in assembled state in the open roof construction is positioned opposite and in close vicinity of the light source 11, such that light emitting of the light source 11 enters each of the light fibers 13 collected in the first connector 14. Such first connector 14 may be a plastic connector having a circular shape or another suitable shape, for instance a square shape. The shape of the first connector 14 should be made such that the bundle of fibers 13 is packed closely to each other to reduce the frontal surface of the first connector 14 and to have an optimum shape of the packed light fibers 13 for receiving the light emitted by the light source 11. The second connector 15, when assembled in the open roof construction is positioned along the edge 6 of a light emitting layer 5. In this embodiment of FIG. 2 the light emitting layer 5 is the lower layer 4". The second connector 15 can be made of plastic and has an elongated rectangular shape, whereby each of the fibers 13 is fixed in the second connector 15 at distances X with regard to each other. The light fibers 13 are fixed in the second connector 15 by means of molding the light fibers 13 into the connector 15 during the molding process of the connector. It is also conceivable that the light fibers 13 are fixed by a gluing operation into the second connector 15.

The bundle of light fibers 13 extending from the first connector 14 towards the second connector 15 is grouped together in a bundle extending in a longitudinal direction along the longitudinal edge 6 of the light emitting layer 5. Each fiber 13 of the bundle that is fixed in the second connector 15 branches of the bundle towards the second connector 15. In the embodiment in FIG. 2 the light source 11 is positioned forward of the first connector 14 seen in longitudinal direction. From a point of view of space this may be advantageous however it may be conceivable that the light source 11 is positioned rearward of the first connector 14. In the embodiment in FIG. 2 the light emitting layer 5 is the lower layer 4". The light emitting layer 5 is capable of emitting light into the interior space 9 of the vehicle. As can be observed in FIG. 2 at least a part of the light device 10 is protected by a protective unit 16, whereby the light device 10 partly is surrounded by the protective unit 16 and the layers 4, 4', 4" of the cover 1, 1'. In the embodiment of FIG. 2 this protective unit 16 is reinforcement 19 of the cover 1, 1' also shown in FIG. 5. Such reinforcement 19 is used to reinforce the cover 1, 1' to reduce the deflection of the cover 1, 1' in the open roof construction during driving conditions of the vehicle. Such reinforcements 19 may be made of metal. The protective unit 16 is open at a first end and at an opposite second end. To close the inside of the reinforcement 19 against entrance of encapsulation material 7, a first and second plug 19', 19" are placed in the openings create by the first and second end of the reinforcement 19 and the inside of the layers 4, 4', 4" of the cover 1, 1'.

Figure 3:
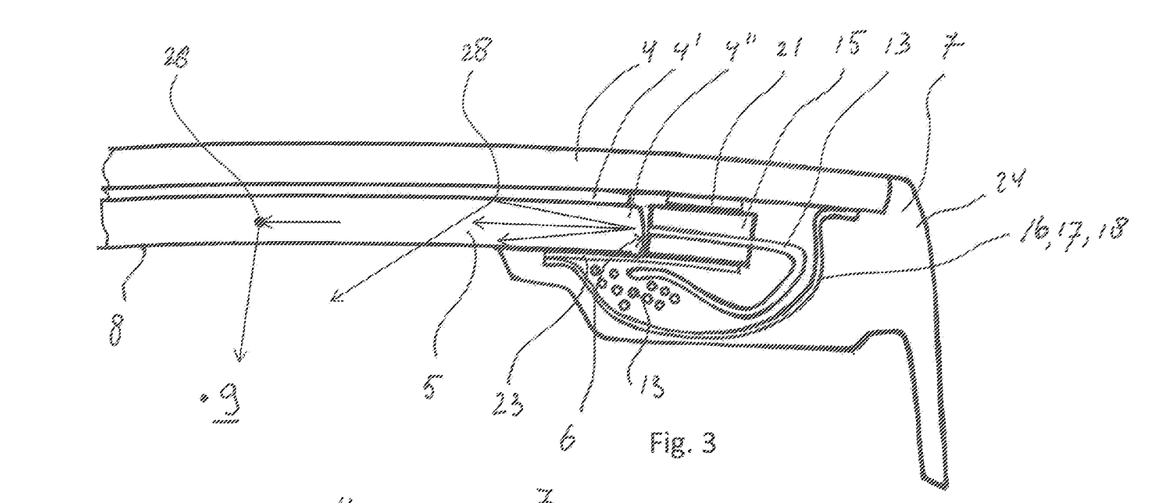

In FIG. 3 a cross-sectional view is shown according to line III-III in FIG. 2, wherein the cover 1 is shown having an upper and a lower layer 4, 4" and whereby the lower layer 4" is connected to the upper layer 4 by means of an adherence layer for instance a PVB layer which is the intermediate layer 4'. The second connector 15 is mounted perpendicularly to the edge surface 6 of the lower layer 4", which is the light emitting layer 5 in this embodiment. The second connector 15 is fixed with its upper side to the lower edge of the upper layer 4 by means of a double sided tape 21 or the like. The second connector 15 is supported by a support bracket 23. The second connector 15 may also be adhered to the support bracket 23 by a double sided tape 21 or the like (not shown in FIG. 3). The bundle of light fibers 13 extending from the first connector 14 towards the second connector 15 are grouped together in a bundle extending in a longitudinal direction along the longitudinal edge 6 of the light emitting layer 5. Each fiber 13 of the bundle that is fixed in the second connector 15 branches of the bundle of light fibers 13 towards the second connector 15, whereby a minimum radius of the fiber is maintained of approximately 30 mm. The bundle of light fibers 13 in the embodiment of FIG. 3 is protected by a protective unit 16 in the form of a protection sleeve 17 or a protection foil 18. Such a sleeve 17 or foil 18 is made of a thin plastic layer. The protection sleeve 17 or foil 18 is connected (for instance by means of a double sided tape 21, not shown in FIG. 3) to either of the inner layer 4", the support bracket 23, the inner face of the upper layer 4. As is shown in FIG. 3 the light fibers 13 emit light into the light emitting layer 5. The light emitting layer 5 may be equipped with a coupler 28 for coupling out the light, which emit light into the direction of interior space 9 via main surface 8. It may be conceivable that the coupler 28 for coupling out the light are particles inside the light emitting layer 5 or it may be a print of ink or paint, for instance on the upper face of the light emitting layer 5 which emits light into the direction of the interior space 9. The embodiments in FIGS. 4, 5, 6, 7, 8 and 9 comprises likewise couplers 28 for coupling out the light (not shown) in the respective light emitting layers 5 and are thus also capable of emitting light towards the interior space 9.

Figure 4:
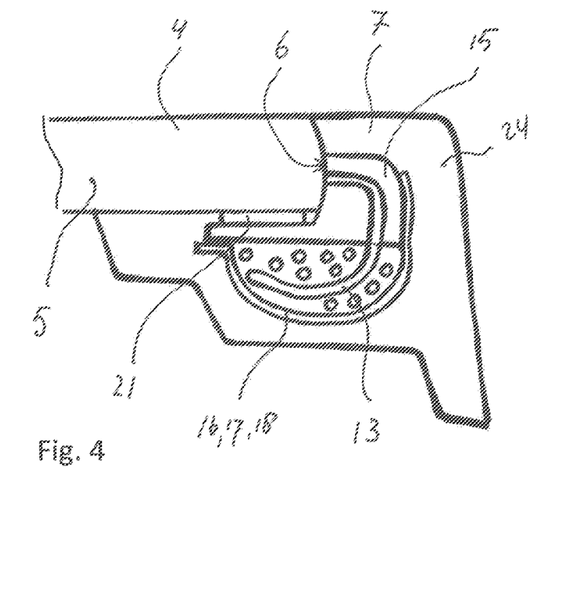

In FIG. 4 the second connector 15 in this embodiment is attached to the light emitting layer 5 of a cover 1 having only one layer 4. The second connector 15 has a shape such that it is fixed by means of a double sided tape 21 to the lower face of the light emitting layer 5 and that the end of the light fibers 13 are positioned adjacent to the edge surface 6 of the light emitting layer 5. The protective unit 16 here is a sleeve 17 or a foil 18 which is attached to the second connector 15 by for instance double sided tape 21 (not shown) which protects the bundle of light fibers 13 from direct contact with the encapsulation material 7.

Figure 6:
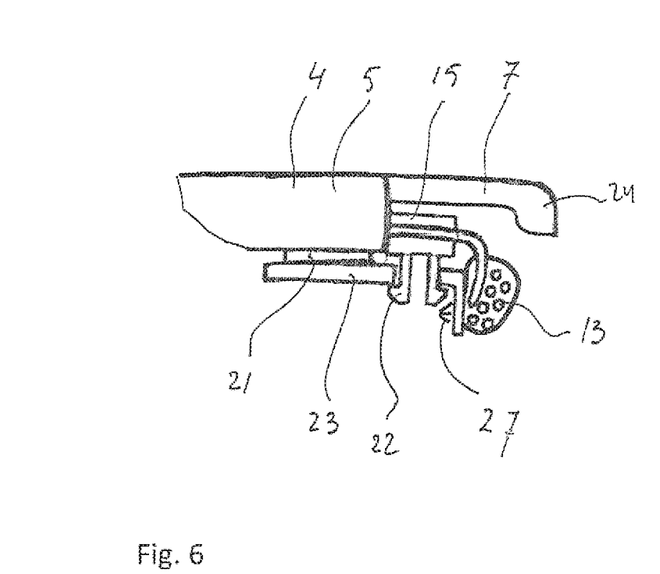

In FIG. 6 the second connector 15 is clipped by means of a clip fixing 22 to the support bracket 23. The support bracket 23 is connected to the lower face of a single layered cover 1 by means of for instance double sided tape 21. In this embodiment the encapsulation material 7 is only a small portion which is attached only to the light emitting layer 5 of the cover 1. The bundle of light fibers 13 is supported and fixed at regular distances along the longitudinal edge 6 of the light emitting layer 5 by means of clip fixings 27, the latter which are connected or clipped into the support bracket 23.

Figure 7:
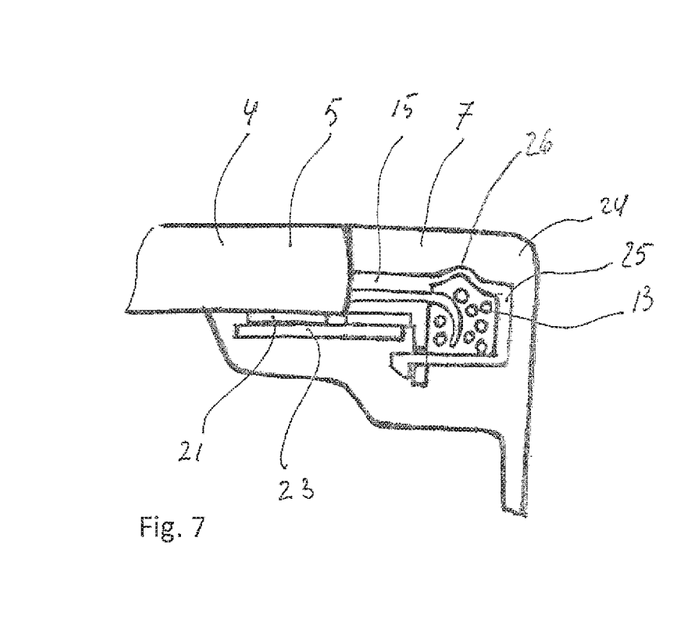

In FIG. 7 the second connector 15 is connected to a support bracket 23 by means of for instance double sided tape 21. The support bracket 23 is attached to the lower face of the light emitting layer 5. In this embodiment the second connector 15 comprises a connector base part for fixing the light fibers 13 at regular distances X and a protective unit 16 which is in this embodiment a protector cover 25 being connected to the connector part by means of a film hinge 26. The protector cover 25 is further being clipped to a protruding part of the connector base part. The encapsulation material 7 in this embodiment surrounds the second connector 15, the support bracket 23 and part of the edge 6 of the light emitting layer 5. The light fibers 13 are protected by means of the protector cover 25 against the encapsulation material 7.

Figure 8:
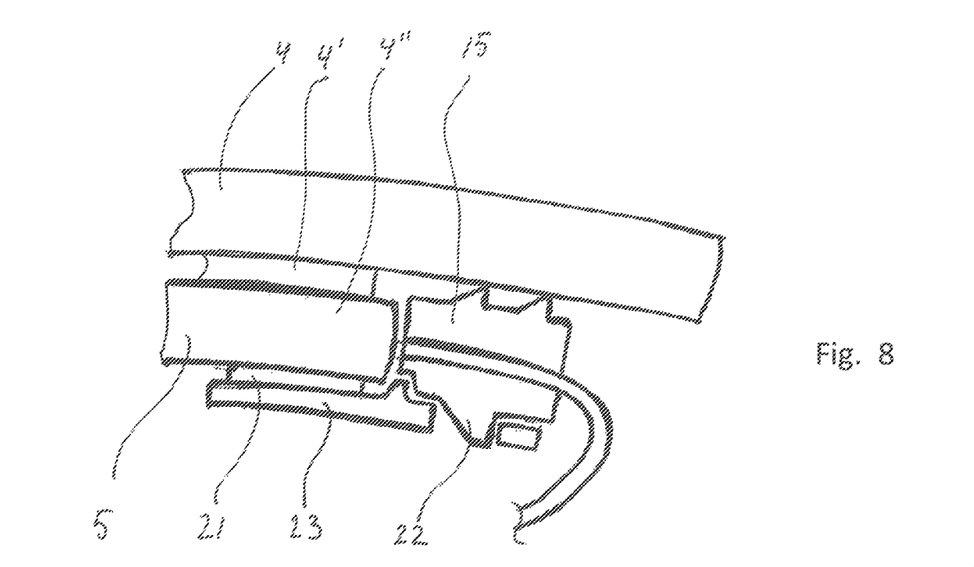

In FIG. 8 the second connector 15 is fixed in between the support bracket 23 and the inner face of the upper layer 4 of the cover 1, by means of a clip fixing 22 integrated to the body of the second connector 15.

Figure 9A:
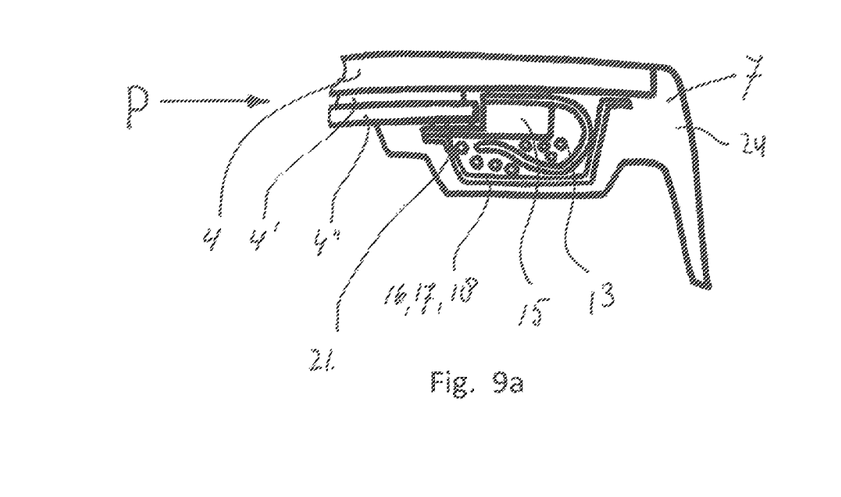
Figure 9B:
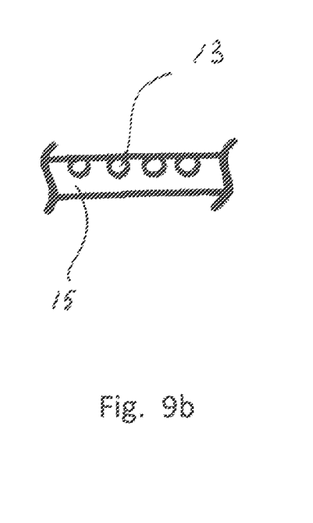
FIG. 9b schematically illustrates a part of a view in direction of arrow P of the second connector.

In FIG. 9a the second connector 15 is fixed to the lower face of the lower layer 4" and the fibers 13 fixed in the second connector 15 are perpendicularly facing a light emitting layer 5 which is the intermediate layer 4' in this embodiment. The second connector 15 may be additionally fixed to the inner face of the upper layer 4. The light fibers 13 are positioned in the body of the second connector 15 such that the upper surface of the fibers 13 are exposed and engage the lower face of the upper layer 4, such as is schematically shown in FIG. 9b. The light fibers 13 are protected by a protective unit 16, which may be a sleeve 17 or a foil 18, which is fixed by means of a double sided tape 21 against the lower face of the lower layer 4" and the lower face of the upper layer 4.

Figures 10A, 10B:
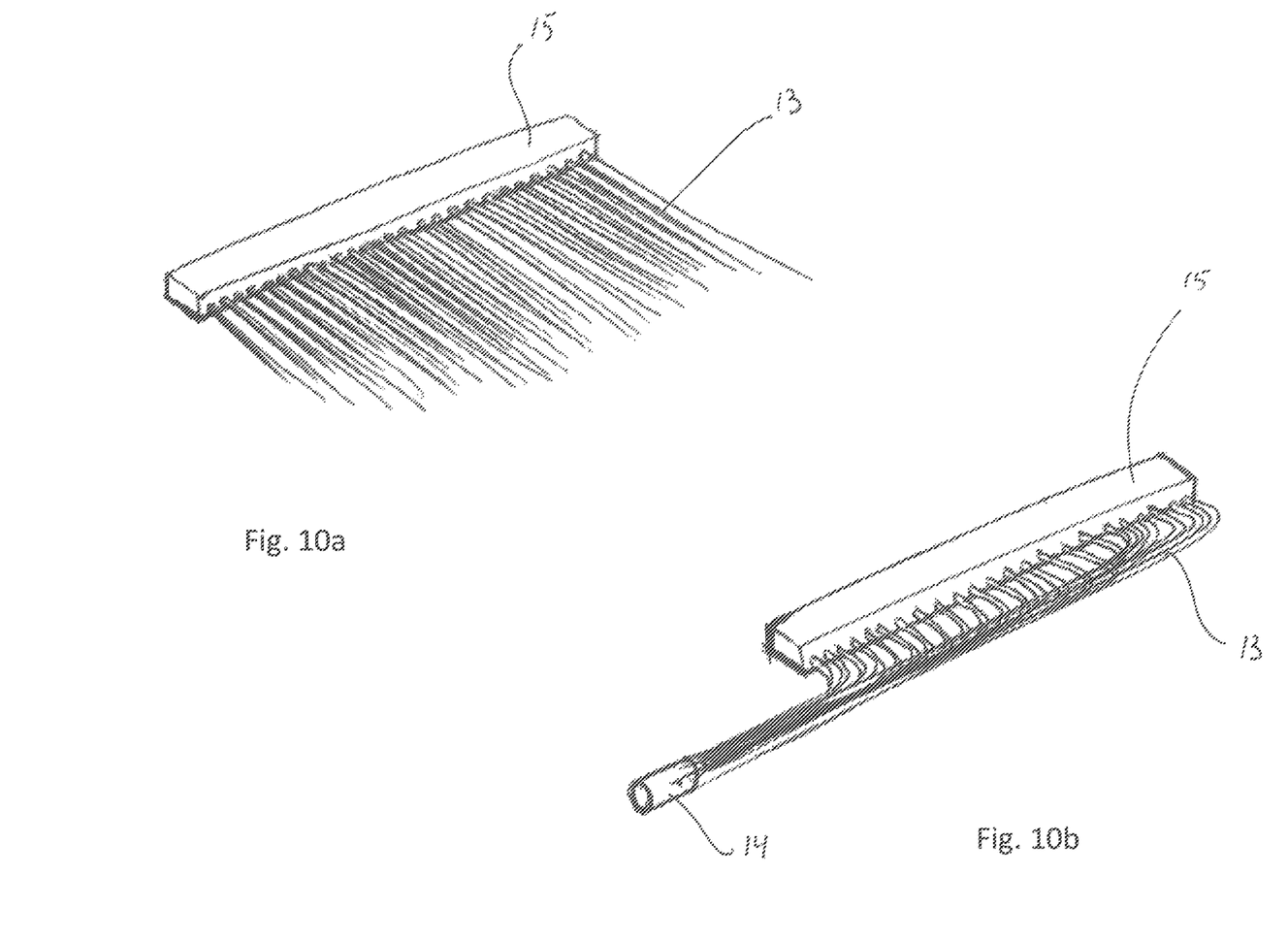
FIGS. 10a and 10b schematically show the light fibers and the second connector in two different stages of manufacturing.

In FIG. 10a it is disclosed how the second connector 15 and the fibers 13 are orientated in such position that the connection between the fibers and the second connector 15 can be made in a manufacturing process. In FIG. 10b the second connector 15, the bundle of fibers 13 and the first connector 14 are shown in the orientation such as is obtained when the light device 10 is assembled to the cover 1, 1'.

Figure 11A:
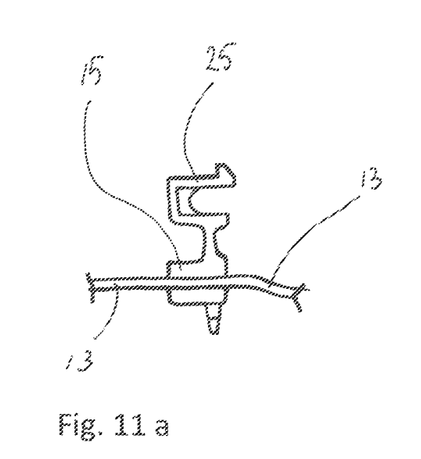
FIGS. 11a-d schematically show the second connector in various stages of manufacturing.

In FIGS. 11a to 11d further details are shown of the second connector 15 of the embodiment of FIG. 7. In FIG. 11a it is shown that the light fibers 13 are molded into the body of the second connector 15 and that the light fibers 13 extend with a surplus length outside the body of the second connector 15. This may be favourable in the production process to hold the light fibers 13 in place at both ends and thus at either side of the second connector 15 during the molding process of the second connector 15.

Figure 11B:
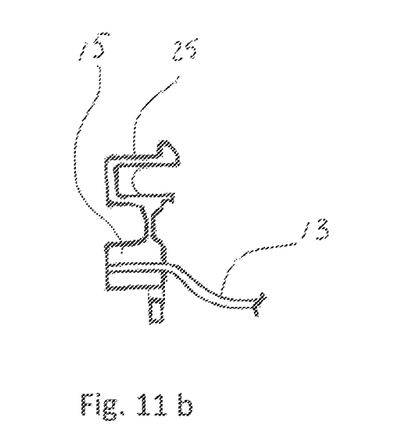

After the molding process the surplus length of the light fiber 13 may be cut off along the surface of the body of the second connector 15 in FIG. 11b.

Figure 11C:
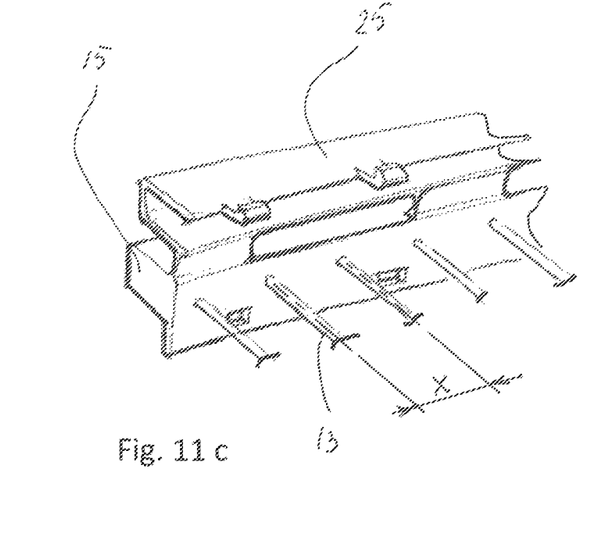
Figure 11D:
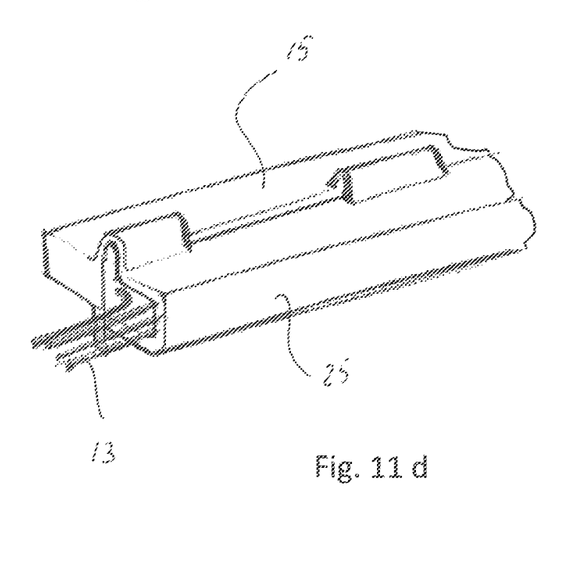

The second connector 15 may than be ready for further preparation of guidance of the light fibers 13 see FIG. 11c, in which distance X is drawn which is measured from centreline to centreline of each of the fibers mounted in the second connector 15. Next step is guiding the fibers 13 along the longitudinal length of the second connector 15 to one longitudinal end of the second connector 15 and whereby then afterwards the protector cover 25 may be closed to cover the light fibers 13 as is shown in FIG. 11d.

The invention is not limited to the embodiments described before which may be varied widely within the scope of the invention as defined by the appending claims. For instance all embodiments shown in FIGS. 3 to 9b may be incorporated in a rear cover 1'.

The invention claimed is:

1. An open roof construction for a vehicle, comprising:
   at least one cover configured to close an opening in a fixed roof of the vehicle, the at least one cover comprising:
   a light emitting layer configured to guide light from a longitudinal edge of the light emitting layer, substantially parallel to a longitudinal direction of the vehicle, towards a main surface and configured to emit light from a main surface of the light emitting layer towards an interior space of the vehicle; and
   a light device configured to emit light into the light emitting layer, the light device comprising at least one light source and a light guide configured to guide light from the at least one light source to the edge of the light emitting layer, wherein the light guide is formed by a bundle of light fibers existing of several light fibers, wherein the light guide is formed by a bundle of light fibers existing of several light fibers, wherein the light fibers of the bundle of light fibers at a first end are accumulated closely together and are fixed in a first connector and wherein the first connector is positioned opposite to a light emitting surface of the at least one light source such that light from the at least one light source enters the light fibers and wherein each of the light fibers of the bundle of light fibers at a second end are fixed at distances X adjacent to each other in a second connector configured to hold the second ends of the light fibers in a perpendicular direction with regard to the longitudinal edge of the light emitting layer to enable the light from the light fibers to enter the longitudinal edge of the light emitting layer, the fibers extending in a bundle from the first connector parallel to the respective longitudinal edge and are then branched off one by one to each respective position perpendicular to the longitudinal edge in the second connector.

2. The open roof construction according to claim 1 wherein the light emitting layer is a layer of glass or a plastic layer.

3. The open roof construction according to claim 1 wherein the light emitting layer is either of an upper layer, an intermediate layer, or a lower layer of the at least one cover.

4. The open roof construction according to claim 1 wherein the distances X between the light fibers lies within a range of 0.125 mm and 50 mm.

5. The open roof construction according to claim 1 wherein the light fibers are either of glass material or of PMMA, and wherein a diameter of each fiber is in the range of larger than 0.125 mm for glass fibers or larger than 0.25 mm for PMMA.

6. The open roof construction according to claim 1 wherein the light fibers are protected in between the first and the second end in a protective unit for avoiding the fibers to be damaged, the protective unit either being a plastic protection sleeve, a protection foil, a cover reinforcement or a protector part attached to the second connector.

7. The open roof construction according to claim 1 wherein the second connector is connected by a double sided tape or a clip fixing to either of the light emitting layer, the cover reinforcement, a support bracket attached to the at least one cover or to another layer of the at least one cover.

8. The open roof construction according to claim 1, wherein a circumferential edge of the at least one cover is made of encapsulation material.

9. The open roof construction according to claim 1 wherein the bundle of light fibers in between the first end and the second end is held by clip fixings attaching the bundle of fibers at intermittent distances to the at least one cover.

10. The open roof construction according to claim 1, wherein the light fibers extend with a radius R larger than 30 mm. between the first end and the second end.

11. The open roof construction according to claim 1 wherein the light emitting layer further comprises a coupler configured to couple out the light such that the light emits from a main surface towards an interior space of the vehicle.

12. The open roof construction according to claim 1 wherein the open roof construction comprises two covers positioned adjacent to each other seen in a longitudinal direction of the vehicle and wherein each of the covers comprises a light emitting layer configured to guide light from a longitudinal edge of the at least one cover and configured to emit light from a main surface into an interior space of the vehicle.

13. The open roof construction according to claim 6, wherein the protector part is a protector cover connected to the second connector by a film hinge.

14. An open roof construction for a vehicle, comprising:
   at least one cover configured to close an opening in a fixed roof of the vehicle, the at least one cover comprising:
   a light emitting layer configured to guide light from a longitudinal edge of the light emitting layer, substantially parallel to a longitudinal direction of the vehicle, towards a main surface and configured to emit light from a main surface of the light emitting layer towards an interior space of the vehicle; and
   a light device configured to emit light into the light emitting layer, the light device comprising at least one light source and a light guide configured to guide light from the at least one light source to the edge of the light emitting layer, wherein the light guide is formed by a bundle of light fibers existing of several light fibers, wherein the light fibers of the bundle of light fibers at a first end are accumulated closely together and are fixed in a first connector and wherein the first connector is positioned opposite to a light emitting surface of the at least one light source such that light from the at least one light source enters the light fibers and wherein the light fibers of the bundle of light fibers at second ends opposite the first ends are fixed in a second connector to hold the second ends of the light fibers in a spaced apart relationship along the longitudinal edge and in a perpendicular direction with regard to the longitudinal edge of the light emitting layer to enable the light from the light fibers to enter the longitudinal edge of the light emitting layer, the fibers extending in a bundle from the first connector parallel to the respective longitudinal edge and are then branched off one by one to each respective position perpendicular to the longitudinal edge in the second connector.

15. The open roof construction according to claim 14 wherein the light fibers are held in between the first ends and the second ends in a protective unit.

16. The open roof construction according to claim 14, wherein the light fibers extend with a radius R larger than 30 mm. between the first end and the second end.

17. The open roof construction according to claim 14 wherein the light emitting layer further comprises a coupler configured to couple out the light such that the light emits from a main surface towards an interior space of the vehicle.

18. The open roof construction according to claim 14 wherein the open roof construction comprises two covers positioned adjacent to each other seen in a longitudinal direction of the vehicle and wherein each of the covers comprises a light emitting layer configured to guide light from a longitudinal edge of the at least one cover and configured to emit light from a main surface into an interior space of the vehicle.

19. The open roof construction according to claim 15 wherein the bundle of light fibers in between the first end and the second end is held by clip fixings attaching the bundle of fibers at intermittent distances to the at least one cover.

20. The open roof construction according to claim 15, wherein the protector part is a protector cover connected to the second connector by a film hinge.

* * * * *